Aug. 8, 1967  F. WHEATLEY, JR  3,334,652
CHECK VALVE PERMITTING PASSAGE OF PHYSICAL
OBJECT THERETHROUGH

Filed Jan. 6, 1964

INVENTOR.
FRANK WHEATLEY JR
BY
Head & Johnson
ATTORNEYS

Aug. 8, 1967  F. WHEATLEY, JR  3,334,652
CHECK VALVE PERMITTING PASSAGE OF PHYSICAL
OBJECT THERETHROUGH
Filed Jan. 6, 1964  2 Sheets-Sheet 2

INVENTOR.
FRANK WHEATLEY JR.
BY
Head & Johnson
ATTORNEYS

United States Patent Office
3,334,652
Patented Aug. 8, 1967

3,334,652
CHECK VALVE PERMITTING PASSAGE OF PHYSICAL OBJECT THERETHROUGH
Frank Wheatley, Jr., Tulsa, Okla., assignor to Frank Wheatley Industries, Inc., Tulsa, Okla., a corporation of Oklahoma
Filed Jan. 6, 1964, Ser. No. 335,944
1 Claim. (Cl. 137—527.8)

This invention relates to improvements in a check valve. More particularly the invention relates to a check valve having improved means of passing spherical solid members therethrough. In another particular, the invention relates to a check valve characterized by an easily opened clapper wherein the check valve nevertheless includes positive closure means. Still more particularly, the invention relates to a clapper type check valve wherein the clapper is easily opened but positively closes and in an arrangement wherein the clapper pivots rapidly out of the fluid stream.

Spherical physical objects are frequently introduced into flow lines. One such application occurs when a fluid line is used for conducting more than one petroleum product. When a transition is made from one product, for instance crude oil, to a different product, as an example gasoline, to prevent contamination of each fluid with the other, a physical separator is interposed between the different fluids in the line. The best method found of accomplishing this separation is to place in the line a spherical rubber ball. The ball is ordinarily of a diameter conforming approximately to the internal diameter of the pipe. The ball is usually hollow and is inflated with water so that it will have approximately the same, or a slightly higher, specific gravity than the fluids being moved through the line.

In another application, spherical balls are introduced into gas lines as a means of removing condensate. In this application a ball is inserted into a gas line and is moved through the line by a gas flow. When condensate, which usually is trapped in low places in the line is encountered, the ball forces the condensate to move before it in the line. In this manner, by passing a series of balls through gas lines, condensates may be substantially prevented from accumulating in the line.

Other applications include the passage of physical objects such as balls, through lines to remove paraffin accumulations.

Equipment has been manufactured to insert and remove the balls from lines. One difficulty which has to the present time not been adequately overcome is the provision of a check valve which will permit passage of balls or other physical objects, but, will positively close to prevent fluid flow in the opposite direction.

When a physical object, such as a ball, encounters a check valve of the ordinary design, it has been found that a substantial pressure build up is required to force the valve clapper out of the fluid path sufficiently to permit the ball to pass through. This problem has been overcome in the valve of the present invention in several ways. First, a valve is provided wherein the clapper is hingedly supported in such a way that the clapper positively closes by its own weight but wherein the force required to pivot the clapper to open position is reduced to a minimum. Second, a valve is provided wherein the clapper is pivoted in such a way that the clapper swings from fully closed to fully open position in an arc of less than 90°. Third, a valve is provided having a lower lip extension on the clapper affording a substantially level path through the valve.

The present invention contemplates a novel check valve adaptable for passing a physical object therethrough with a minimum retardation but which nevertheless has a positive closing action against reverse fluid flow. Broadly stated the invention may be defined as a positive closing check valve adaptable for passing a physical object therethrough, a seat formed in said valve body surrounding said opening, a clapper supported to pivot about on axis within said body, said axis extending in a plane perpendicular to the axis of said opening in said valve, said clapper having a seating surface formed thereon adaptable to engage, when said clapper is pivoted to closed position, said seat formed in said valve body, whereby said valve is closed against fluid passage and wherein said axis about which said clapper pivots is displaced at an angle from the vertical.

It is therefore an object of this invention to provide a check valve for a pipe which will permit passage of physical devices therethrough, but which nevertheless has a positive action to close and thereby prevent reverse fluid flow in the line.

Another object of this invention is to provide a check valve which will exert a minimum restriction to the passage of a physical object in the line in which the valve is inserted, and which will have a positive closure action to close the line against reverse flow of fluid, but which requires no springs, levers, weights or other attachments.

Another object of the invention is to provide a check valve of the swinging or pivoting clapper type wherein the clapper is pivoted in such a way that the clapper as it opens, more rapidly moves out of the fluid path, and wherein the clapper is so pivoted that it positively closes by the effect of gravity and is opened by a minimum force.

Another object of this invention is to provide a check valve which has the characteristic, according to its unique design, to open easily but close positively, and including means whereby a ball or other physical object passes therethrough without substantial elevation deviation.

These and other objects will be apparent and a better understanding of the invention may be had by referring to the following description and claims taken in conjunction with the attached drawings in which:

Figure 1:
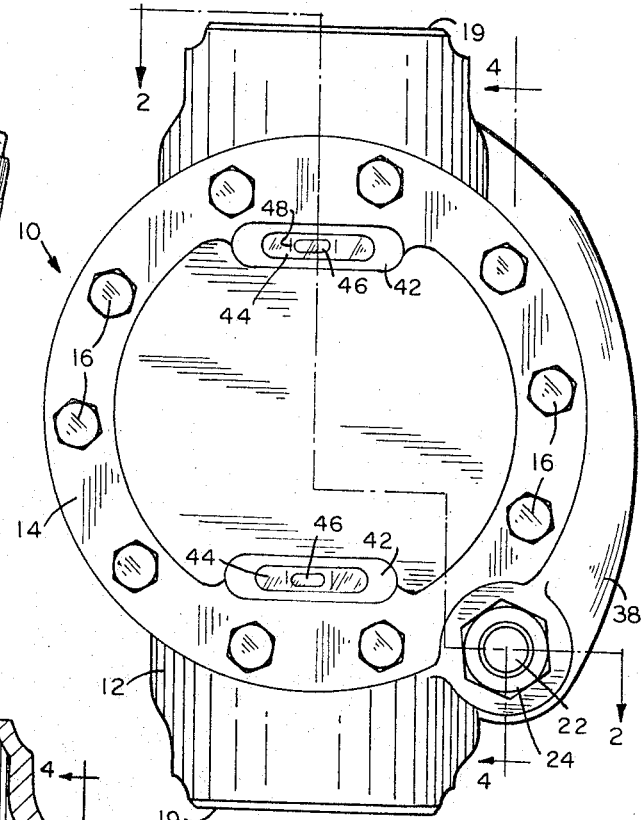
FIGURE 1 is a top view of the valve of this invention.

Referring first to FIGURE 1 the valve is indicated generally by the numeral 10. The valve is formed of a body 12 which is cast to approximately the internal and external configurations shown in the drawings and machined where necessary. A cover 14 is supported to body 12 by bolts 16. By removing bolts 16 cover 14 may be removed, exposing the internal mechanism of the valve 10. A fluid passage extends through the valve body 12. Passage 19 is at least equal the diameter of the line (not shown) to which the valve is attached in typical applications so that fluids and gases as well as physical objects may pass through the valve.

Figure 2:
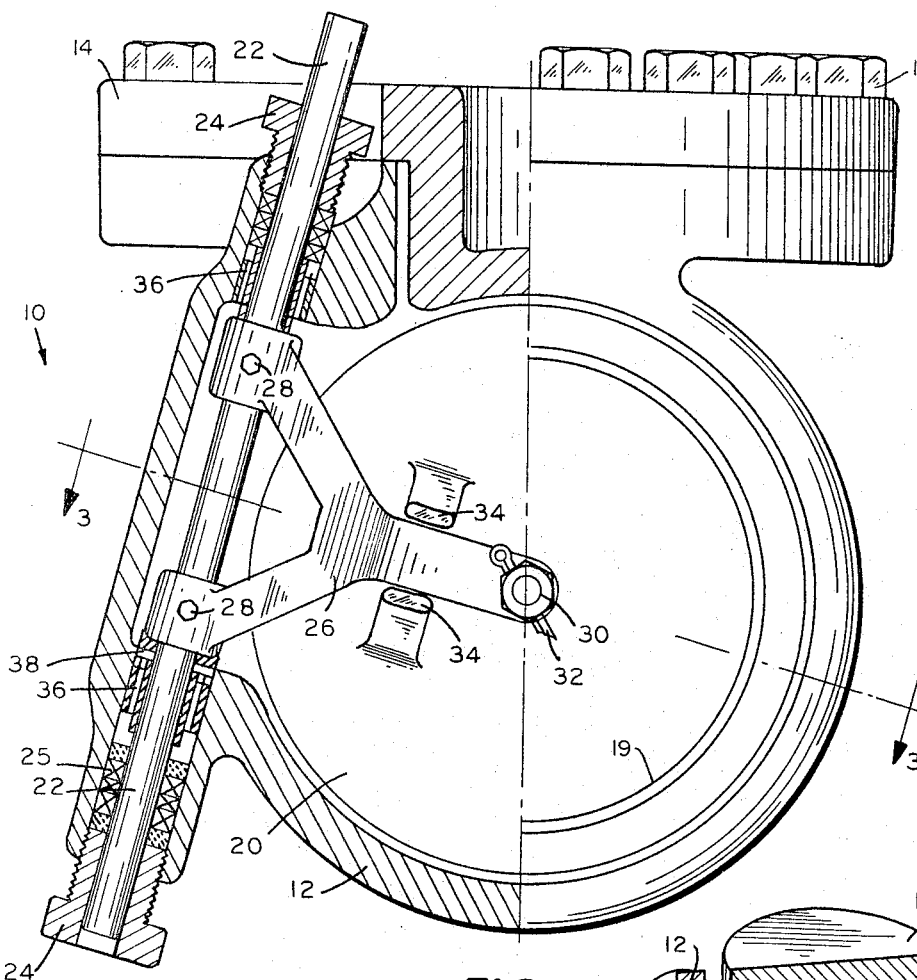
FIGURE 2 is a cross-sectional view taken along the line 5–2 of FIGURE 1.

Referring next to FIGURE 2, the valve is shown in an end-view and partially in cross section.

Pivoted to body 12 is a valve clapper 20. The manner in which clapper 20 is pivoted to the body 12 is the essence of the simplest embodiment of the invention and will be described in detail.

Arm pin 22 is secured within body 12 to clapper 20 so that clapper 20 pivots about the axis of arm pin 22 by movement of the flow of liquid or gas through the valve.

Upper and lower gland nuts 24 serve to maintain packing 25 around arm pin 22 and the body 12 is prevented.

Clapper 20 is supported to arm pin 22 by arm 26. Set screws 28 securely affix the arm 26 to arm pin 22. A clapper nut 30, restrained in position by cotter pin 32, secures the clapper 20 to arm 26. Positioning bosses 34, integrally formed with clapper 20, serve to maintain clapper 20 and arm 26 in a substantially fixed but flexible relationship.

Needle bearings 36 are shown positioned between arm pin 22 and body 12 to insure free pivotation of clapper 20 with respect to body 12.

To further insure that minimum frictional restriction will exist to retard the pivotation of clapper 20, a thrust bearing 38 is positioned between the lower surface of arm 26 and body 12. The weight of clapper 20 and arm 26 is primarily supported by thrust bearing 38. In this manner, thrust bearing 38 in conjunction with needle bearings 36, provides a bearing 38 in conjunction with needle bearings 36, provides a bearing arrangement insuring a very minimum of frictional retardation of the pivotation of clapper 20 relative to body 12. The provision of needle bearings 36 and thrust bearing 38 is optional and not essential to the invention.

Figure 5:
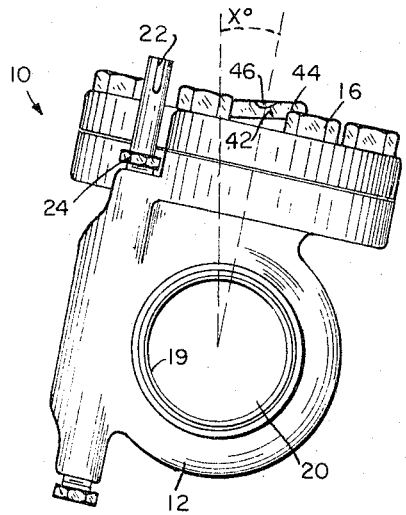
FIGURE 5 is an end view of the valve of this invention showing the use of a bubble level indicator as a means of insuring proper installation of the valve.

Integrally formed with cover 14 is a leveling pad 42 best seen in FIGURES 1 and 5. Secured to the top surface of leveling pad 42 is a bubble or spirit level 44. The spirit level 44 is typically formed of a glass tube having a liquid therein which fills all of the space within the tube except for a bubble of air 46. The bubble 46, when centered between marks 48, indicates that the level 44 is horizontal, which in turn means that the upper surface of leveling pads 42 is horizontal and that thereby the valve is properly positioned.

Figure 4:
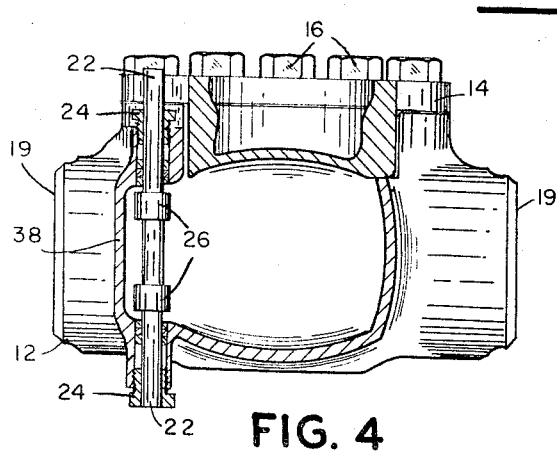
FIGURE 4 is a cross-sectional view taken along the line 4—4 of FIGURE 1 and FIGURE 3.

The view of FIGURE 4, which is partially cross-sectional discloses that the arm pin 22 is vertical, or in other words, it lies in a plane substantially parallel the plane of the valve seating face and perpendicular the longitudinal axis of valve fluid passage 19.

Figure 3:
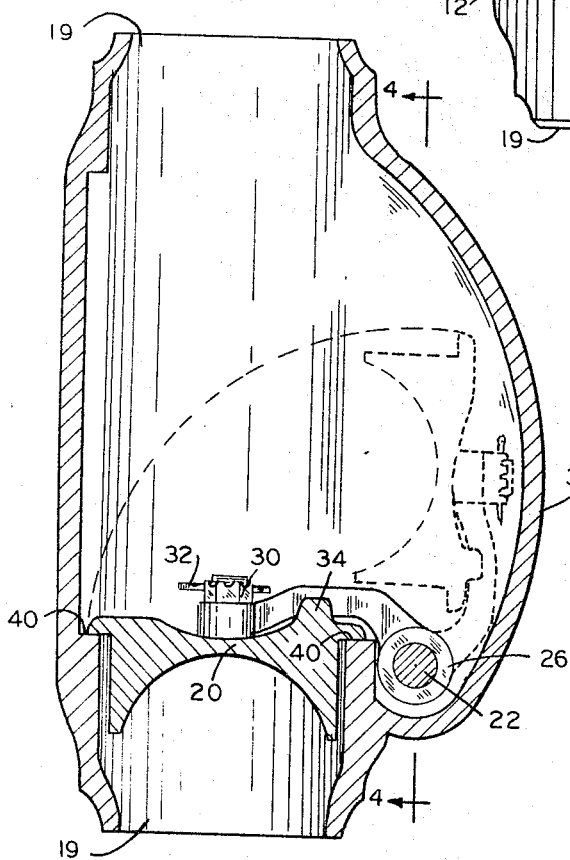
FIGURE 3 is a cross-sectional view taken along the lines 3—3 of FIGURE 2.

FIGURE 3 is a top cross-sectional view of the valve. Formed in the valve and surrounding fluid passage 19 is valve seat 40. The valve clapper 20 pivots to closed position against seat 40 to prevent reverse fluid flow through the valve. One of the novel features of this invention is the positioning of the arm pin 22 in a plane parallel the plane of seating face 40 and displaced rearwardly of the seating face 40. In this manner, as the clapper pivots from fully closed to open position, the clapper moves more quickly out of the fluid passage 19. The clapper 20 travels through an arc of less than 90° in transversing from fully closed to fully opened position. In addition, this arrangement makes possible a more compact construction, the valve having a reduced length.

Figure 7:
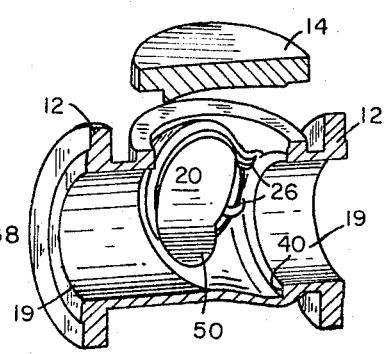
FIGURE 7 is a cut-away isometric view of the alternate embodiment of FIGURE 6 showing the valve clapper in open position.
Figure 6:
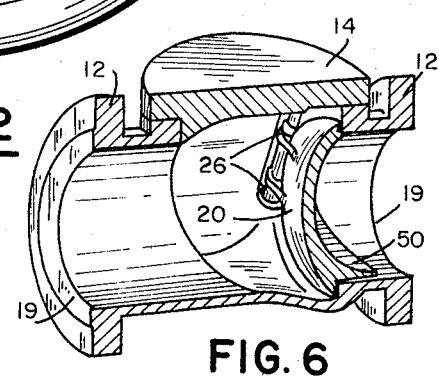
FIGURE 6 is a cut-away isometric view of the valve of this invention in closed position, showing an alternate design of the clapper.

An important additional alternate arrangement of the invention is shown in the configuration of FIGURES 6 and 7. In this arrangement, clapper 20 is altered in construction to provide an integral lower extending lip portion 50. This lip portion 50 performs an important service when the valve is used in an installation requiring the passage of a physical object, such as a ball. When clapper 20 is closed, lip portion 50 extends within the body valve seat as shown in FIGURE 6. When the object reaches the valve, clapper 20 will swing to fully opened position, as shown in FIGURE 7, unless of course, it is not already in such position due to fluid flow ahead of the ball. In the position of FIGURE 7 the lower lip portion 50 extends substantially across the lower portion of the fluid passage 19 to provide a substantially smooth base for the passage of a ball through the valve. Without the lip portion 50 a ball traveling through the valve would fall downwardly after passing through valve seat 40 and tend to remain there, requiring increased fluid flow to move it onward. By the provision of lip portion 50 the elevation of the ball passing through the valve remains substantially unchanged, reducing the chance the ball will lodge in the valve.

The provision of level 44 as shown in FIGURES 1 and 5, makes positioning of the valve in a line to conform to the proper angular displacement, determined by factory investigation, very easy and simple. In positioning the valve in the line, whether it is to be welded or bolted into position, workmen merely place the valve so that the small bubble 46 is within the marks 48 and the valve is then secured into position. Once the valve is positioned in the line there is nothing to change or to get out of adjustment.

The optimum angle of displacement from the vertical of arm pin 22 indicated in FIGURE 5 by X degrees, for proper functioning of the valve, depends primarily upon the size of the valve. It has been determined, for instance, that in a two inch valve angle X should be approximately twenty degrees, that is, the axis of arm pin 22 is tilted twenty degrees from the vertical. As the size of the valve increases, and consequently the clapper 20 and arm 26 become heavier, the required angle of deviation from the vertical becomes less. For instance, in sixteen inch valves the angle required is only approximately eight degrees. Intermediate size valves require angular displacements between these extremes. Smaller valves than two inches will take correspondingly large angle displacements. As the valves become larger it is found that increase in size begins to make less and less difference in the angle required so that valves larger than sixteen inches will nevertheless require substantially eight degrees displacement or a very small amount less than this.

To determine the proper angular displacement of a valve of this invention it is positioned so that with no flow through the valve, and with the clapper 20 pushed fully open as would occur when a ball or other physical object passes therethrough, the clapper will slowly but positively swing closed when released.

Some latitude exists in the exact angular displacement required for any given value. The angular displacement is required to be small enough that the weight of the clapper 20 can be easily overcome by fluid flow or by a physical object passing through, and yet the displacement must be large enough so that when fluid flow ceases, or reverses, clapper 20 automatically gravitates to the closed position.

The valve 10 is normally positioned horizontally in a line as measured by an axis passing through the valve opening 19. The axis of fluid passage 19 preferably coincides with the tubular axis of the line 17, which valve is secured. Slight deviations in setting the axis of passage valve 19 horizontally will not disturb the functioning of the valve.

In the important embodiment of the invention shown in FIGURES 6 and 7, the clapper 20 is designed so that the lower lip portion 50 extends, when the clapper is opened, to provide a smooth path over which physical objects can pass. Thus, if the integral placement of lip portion 50 of the clapper 20 is co-ordinated with the degree of deviation from the vertical of arm pin 22 so that when the valve is installed the lip portion 50 extends substantially under the bottom of the fluid passageway through the valve when the clapper is in opened position. The co-ordinated combination of the pivotation of the arm pin with the lower lip extension of the clapper provides a value which offers the very minimum restriction to the passage of a physical object therethrough, but in a manner to provide positive closing against reverse fluid flow.

Although this invention has been described with a certain degree of particularity it is manifested that many changes may be made in the details of construction and the arrangement of components without departing from the spirit and scope of this disclosure.

What is claimed:

A positive closing check valve adaptable for passing a physical object therethrough comprising:
- a valve body having a fluid passageway opening therethrough including
- a seat formed in said valve body surrounding said fluid passageway opening, the valve body having an enlarged internal diameter portion therein forwardly of said seat;
- a clapper supported within said valve body forwardly of said seat to pivot about an axis, said clapper pivoting in said enlarged internal diameter portion of said valve body, said clapper having a seating face formed thereon adaptable to engage, when said clapper is pivoted to closed position, said seat formed in said valve body, said axis about which said clapper pivots being displaced at an angle with the vertical whereby said clapper is disposed to gravitate towards the closed position, the axis of pivotation of said clapper lying in a plane substantially perpendicular the axis of said valve fluid passageway opening, said clapper being further defined by an integrally formed lower extending lip portion, said lip portion extending, when said clapper is in the closed position, within said valve seat, and extending, when said clapper is in the opened position, into said enlarged internal diameter portion of said valve body forming a lower surface upon which physical objects passing through said enlarged internal diameter portion of said valve body may travel; and
- means externally of the valve whereby said angle of displacement from the vertical of the axis by which said clapper pivots is determined.

References Cited

UNITED STATES PATENTS

| | | | |
|---|---|---|---|
| 2,172,371 | 9/1939 | Feighan | 137—527.4 |
| 2,913,001 | 11/1959 | Maslow | 137—527.4 |
| 2,930,400 | 3/1960 | Wheatley | 137—527.8 |
| 2,969,492 | 1/1961 | Wheatley | 137—527.8 X |
| 3,075,547 | 1/1963 | Scaramucci | 137—527.4 X |
| 3,143,136 | 8/1964 | Wheatley | 137—527.8 |

FOREIGN PATENTS 139,544   11/1950   Australia.

WILLIAM F. O'DEA, *Primary Examiner.*

HAROLD WEAKLEY, *Examiner.*